Patented Nov. 28, 1933

1,936,718

UNITED STATES PATENT OFFICE 1,936,718

BAKERY PRODUCT AND METHOD OF PRODUCING THE SAME

Stroud Jordan, Brooklyn, N. Y., assignor to Ross and Rowe, Inc., New York, N. Y., a corporation of New York No Drawing. Application December 31, 1931
Serial No. 584,284

7 Claims. (Cl. 99—10)

The present invention relates to the use of lecithin in the art of baking, and to the resultant product.

By the use of lecithin, in accordance with my invention, improved texture, volume and appearance in such products as, bread, cake and pastries, are obtainable.

I am aware of the fact that there is a previous patent disclosing the incorporation of a shortening agent containing a small percentage of lecithin or phosphatide, in bakery products made from flour as a major constituent. However, this patent teaches dissolving the lecithin as such directly into the shortening, and does not teach the idea of first forming an emulsion of lecithin and water, and then incorporating this emulsion with the shortening. As far as I am aware, I am the first to employ an emulsion of lecithin and water, by combining the same with the shortening, or a bakery batch.

It is further known that the addition of lecithin or phosphatide as such, without first forming an emulsion of the lecithin with water, to shortening, may adversely affect the creaming properties of such shortening as well as the volume of the finished bakery products.

The word lecithin is used in its broadest sense and intended to apply not only to the pure substance but also to commercial lecithin, a mixture of commercial lecithin and/or any or all of its components with other phosphatides and/or with fats occurring naturally in the animal and vegetable kingdom, separated or capable of being separated on a commercial scale in the pure or mixed state, which may, for any purpose, contain lecithin in effective amounts.

It is a well known fact, that in general, the greater the viscosity of a mixture or compound, the greater its ability to hold air, which has been mechanically or chemically distributed throughout the same. It has been further demonstrated that lecithin has the ability of completely wetting the surface of solid particles in an oily medium, reducing the viscosity to the practical minimum. It is therefore obvious, that the reduction of viscosity may retard, hinder, or completely prevent emulsification, thereby materially lessening the ability of the resulting mixture to hold air, which has been chemically or mechanically distributed throughout the same. This accounts for the fact that lecithin as such, and without first being emulsified with water, when first dissolved in fat and then added to the shortening and sugar, prevents such mixtures from creaming to the maximum volume, which fact has offered serious objections to the use of lecithin in this manner in the production of bakery products.

I have discovered from observations, that when an emulsion of lecithin and water is first produced, and then this emulsion is incorporated with the shortening and sugar, the viscosity of the resultant mixture is increased, the rate of creaming accelerated, and the final volume of the cream mixture is increased.

My invention may be illustrated by the data which will follow, but I do not wish to limit myself specifically to the amounts of materials used, nor the precise temperatures employed, since these factors may be varied within reasonable limits, as may be required in particular cases.

As an example of my invention in connection with the creaming of cake mixtures before baking, I take 250 parts by weight of shortening, which may be a partly hydrogenated vegetable and/or animal fat or a compound made by the mixture of high melt stearines with low melting natural fats of vegetable and/or animal origin. I next take 2½ parts by weight of 80% commercial lecithin, and emulsify the same in 12½ parts by weight of water. The shortening having been previously placed in a mixing bowl, this separately produced emulsion of lecithin and water is now introduced into the bowl with the shortening, before creaming is actually started, and the whole mass is then mixed thoroughly within the bowl with 500 parts by weight of added sugar, at a temperature of approximately 70° F., to effect proper creaming. The volume obtained from 100 grams of the creamed mixture may vary from 164 to 167 cubic centimeters, according to the time and temperature used in the creaming operation.

If the same proportions of ingredients are employed and the forming of an emulsion with the lecithin and water is omitted, and the same quantity of lecithin as such is first dissolved in a portion of the shortening used, in the ratio of 1 part by weight of lecithin to 4 parts by weight of shortening, then 12½ parts by weight of this mixture is mixed with the remaining bulk of shortening with the sugar, and creamed in exactly the same manner for an identical length of time and under the same temperature, as was practiced when the emulsion of lecithin and water was added, then a finished volume of the resultant mass weighing 100 grams will be found to vary from 122 to 127 cubic centimeters. As a further demonstration, the same formula was employed, with the exclusion of lecithin, and the same creaming operation was practiced, and the same produced a volume of 154 to 162 cubic centimeters for each 100 grams of the creamed mixture. In each of the three tests before enumerated, the creaming of the products were conducted in a room of practically unvarying temperature and any rise in temperature caused by the mechanical action due to creaming was controlled by cooling the mixing bowl.

These data establish the fact that volume will be improved, if an emulsion of lecithin is first made with water and the emulsion added to the mixture of shortening and sugar before creaming, but that volume will not be improved if the lecithin as such is dissolved in a portion of the shortening before being added to the mixture of shortening and sugar. The use of lecithin in accordance with my invention by first forming an emulsion of the same with water, affords a convenient and efficient method for the incorporation of lecithin in bakery products and removes any objection caused by the retardation of creaming rate and the lessening of volume obtained which occurs when lecithin as such is dissolved in a portion of the shortening used.

In the previously described tests on volume after the creaming operation, the quantities of fat or shortening were normal for the particular type of cake produced, that is, the ratio of sugar to shortening has been 2 to 1 by weight. To further demonstrate the beneficial results of the use of the emulsion of lecithin and water, in the manner described, I increased the shortening content in each of the three examples heretofore given by 10% by weight, leaving the sugar weights identical with those heretofore stated. The time used in each creaming operation was 23 minutes and the weighed amounts were then measured for volume. In the creamed mixture, where shortening had been increased by 10% by weight and the lecithin had been first emulsified in 5 times its weight of water and then incorporated into the mass including the shortening and sugar, the creaming taking place at a temperature of 70° F., 100 grams of this creamed mixture was found to have a volume of 181.2 cubic centimeters. In the next test wherein the shortening was increased 10% by weight but the lecithin was entirely omitted, 100 grams of the creamed mixture was found to have a volume of 173.0 cubic centimeters. In the third test, where the lecithin was dissolved in a portion of the shortening used, in the ratio of 1 part lecithin by weight to 4 parts by weight of the shortening, and this mixture then added to the remaining shortening, the entire amount of shortening being increased by 10% by weight, and the shortening was subsequently creamed with the sugar, 100 grams of this creamed mixture was found to have a volume of 136.8 cubic centimeters. These results, when compared with the results obtained in the previous tests where normal quantities of shortening were used, definitely show the beneficial results obtained by first forming an emulsion of lecithin with water and then adding such emulsion to the normal or increased percentage of shortening. They further show that when lecithin as such is dissolved in the shortening, volume is decreased in the creamed products. In my further illustrations of the invention, I will compare only a standard formula with that in which lecithin has been incorporated by first forming an emulsion of lecithin with water.

As a further illustration of the invention, I will give the ingredients used in a special cake mixing process. As will be explained, the lecithin in the form of an emulsion with water may be added in three different manners. The baked cakes from the several mixtures will be compared. The formula is as follows:

| | Parts by weight |
|---|---|
| Sugar | 90.00 |
| Salt | 2.00 |
| Shortening | 45.00 |
| Whole eggs | 50.00 |
| Lecithin | 0.45 |
| Water | 50.00 |
| Dry skim milk | 6.50 |
| Baking powder | 2.00 |
| Flour | 100.00 |

The above combined ingredients produce the batch for the cake. The batch for the standard cake omits the lecithin.

In producing the batch for the standard cake, the eggs, an equal amount of sugar which would be 50 parts by weight and the entire amount of the salt, are combined and whipped. The remainder of the sugar, the entire amount of shortening and a desired flavor are combined and creamed separately. The mass produced by the whipped eggs, sugar and salt is then incorporated with the creamed shortening. In the meantime, the dry skim milk is dissolved in the total amount of water and the baking powder mixed or blended with the flour. The milk solution is then added to the mass previously produced, along with the flour, and the entire mass is suitably stirred or mixed. The batch thus produced is termed by me the standard batch and is used in baking the standard cake. The standard batch does not contain lecithin.

In producing special cake batch No. 1, the same procedure is followed as in making the standard cake batch, with the exception that 1% by weight of lecithin is added based on the weight of the shortening. This lecithin is first emulsified with 5 times its weight of water, and this emulsion is added to the shortening before such shortening is creamed with the sugar.

In producing special cake batch No. 2, the same procedure is followed as in producing special cake batch No. 1, except that the emulsion of lecithin with water is incorporated with the eggs, prior to or while the eggs are being whipped with the sugar.

In producing special cake batch No. 3, the same procedure is followed as in producing special cake batch No. 1, except that the emulsion of lecithin with water is added to the water solution of the milk powder, before such solution is introduced into the presence of the other ingredients.

When cakes are made according to the formulas above given and are baked, it will be found that in each case where the emulsion of lecithin with water was added, that an improved product resulted. The internal texture of the improved product is better, which is exemplified by a more uniform cell structure. The volume of the finished cake is also better where lecithin was added in the form of an emulsion with water. The above comparison applied to cakes made from special cake batches 1 to 3 inclusive, as compared to the cake made from the standard cake batch.

To illustrate the benefits of lecithin, in the form of an emulsion, in cake baking, where no shortening is added, a sponge cake formula will serve as an example. This formula was used in making tests and is as follows:

| | Parts by weight |
|---|---|
| Egg yolks | 60.00 |
| Salt | 2.00 |
| Water | 55.00 |
| Sugar | 100.00 |
| Lecithin | .18 |
| Dry whole milk | 7.00 |
| Cream of tartar | 0.80 |
| Soda | 0.40 |
| Flour | 100.00 |

The above formula with the lecithin omitted is regarded by me as the standard sponge cake batch. In producing the standard sponge cake batch, the total egg yolks, 60 parts by weight are whipped with 60 parts by weight of sugar with the total amount of salt. The remainder of the sugar and the total amount of the dry whole milk are dissolved in the total amount of water. The total amount of soda and cream of tartar are mixed or blended with the flour. The water solution of the dry milk with the 40 parts by weight of sugar may be added at the same time with the blended flour mixture, to the egg yolk mixture and the resultant mass thoroughly stirred or whipped.

In producing special sponge cake batch No. 1, the same procedure is followed as in producing standard sponge cake batch, except that 1% by weight of lecithin, is added. This 1% by weight is based on the weight of the fat in the egg yolks. The fat in egg yolks is taken as 30%. The amount of lecithin is mixed with 5 times its weight of water so that an emulsion is produced, and this emulsion is added to the yolks and sugar mixture.

In producing special sponge cake batch No. 2, the same procedure is carried out as in producing special sponge cake batch No. 1, except that the same emulsion of lecithin with water is added to and stirred with the milk solution.

Cakes were baked employing the standard sponge cake batch, and special sponge cake batches Nos. 1 and 2. From an examination of these cakes, it was found that those in which the emulsions of lecithin with water had been employed, were superior in symmetry, texture and volume.

The effect of shortening in bakery products, particularly in the production of cakes, is well understood by those familiar with the art. There is a maximum percentage, which may be incorporated without diminution in volume or bad effects on the cake structure. When this point is exceeded, results are not satisfactory, but there are times when the total amount of shortening, which can be incorporated, is not sufficient to produce the desired qualities in a finished cake. Increased quantities of shortening may be added if there is included in the formula 1% by weight of lecithin, based on the total weight of shortening, and this lecithin is emulsified in 5 times its weight of water before it is added to the creamed shortening and sugar. As an example of this, cakes have been baked from a standard formula, similar to the one employed in the special cake mixing process for batter cake referred to previously, and the finished cakes have shown that when shortening is increased 10% and with it is added 1% by weight of lecithin based on the total weight of the shortening, said lecithin being emulsified in water, the volume of the finished cake averaged 280.0 cubic centimeters per 100 grams. In the case where no lecithin was employed, the volume of the finished cake showed 246.0 cubic centimeters for each 100 grams. Further than this, the standard cake, in which no lecithin had been incorporated, showed that its normal shortening content had been exceeded, for the lower part of the cake was heavy and gave a raw appearing surface when cut, whereas the cake, in which the lecithin emulsion had been incorporated in the creamed shortening and sugar, showed an increase in volume, a better cake structure and was far superior to the cake in which a normal quantity of fat had been employed. It thus becomes possible to add not only normal, but increased quantities, of fat in the production of cakes when lecithin is incorporated in an aqueous emulsion in the manners hereinbefore set forth.

By normal shortening content of a bakery product is meant that maximum shortening content, without the use of lecithin, which may be used without producing unsatisfactory results in the finished bakery product. Some bakery products, such as pound cake, have a relatively high normal shortening content. When this normal shortening content, without the use of lecithin, is exceeded, the finished product will have a poor texture, parts thereof being heavy and presenting a raw appearing surface when cut, which condition is known as "sad". A layer cake has a normal shortening content less than the normal shortening content of a pound cake, but greater than the normal shortening content of a sponge cake. If the normal shortening content of the layer cake is exceeded, without the use of lecithin, satisfactory results are not obtainable. The layer cake would lose its characteristics as such and more closely resemble the pound cake, although it might not be "sad". A sponge cake contains a very small percentage of shortening, and if the normal shortening content of the sponge cake is exceeded, without the use of lecithin, satisfactory results are not obtainable, as the cake would lose its characteristics as such and resemble a layer cake. It is thus seen that when the normal amount of shortening is exceeded in these cakes, without lecithin, satisfactory results are not obtainable, the pound cake being "sad", the layer cake losing its characteristics as such, and resembling pound cake, and the sponge cake losing its characteristics as such and resembling the layer cake. By normal volume in a finished bakery product is meant substantially that volume which the finished bakery product has, in the absence of lecithin, and where the normal shortening content has not been exceeded. The terms "normal shortening content" and "normal volume" as used in the claims, are employed as above defined.

Having fully described my invention, what I claim is:

1. The method of producing an improved bakery product, comprising forming an emulsion of lecithin and water, combining the emulsion with shortening and sugar, the shortening being present in an increased amount over the normal shortening content of the bakery product, and the lecithin in the emulsion being present at substantially one percent by weight with respect to the weight of the increased shortening, creaming the resultant mass, the emulsion of lecithin and water materially reducing the normal time required for creaming to a selected volume, and combining the creamed mass with the remaining constituents of the batch.

2. The method of producing an improved bakery product, comprising forming an emulsion of lecithin and water, combining the emulsion with shortening and sugar, the lecithin in the emulsion being present in a relatively small amount by weight with respect to the weight of the shortening, creaming the resultant mass, the emulsion of lecithin and water materially reducing the normal time required for creaming to a selected volume, and combining the creamed mass with the remaining constituents of the batch.

3. The method of producing an improved bakery product, comprising forming an emulsion of lecithin and water, combining the emulsion with shortening and sugar, the shortening being present in an increased amount over the normal shortening content of the bakery product and the lecithin in the emulsion being present in a relatively small amount by weight with respect to the weight of the increased shortening, creaming the resultant mass, and combining the creamed mass with the remaining constituents of the batch, the presence of the emulsion of lecithin and water rendering it possible to produce a satisfactory bakery product containing the shortening present in the increased amount over the normal shortening content of such bakery product.

4. A finished bakery product containing shortening in an increased amount over the normal shortening content of the bakery product, and an emulsion of lecithin and water, the finished bakery product having a substantially normal volume and texture.

5. The method of creaming shortening, comprising combining a shortening, an emulsion of water and lecithin, and sugar, and then creaming the resultant mass, the presence of the emulsion of lecithin and water producing a materially increased volume within a given time.

6. The method of creaming shortening, comprising combining a shortening, an emulsion of water and lecithin, and sugar, and then creaming the resultant mass, the lecithin in the emulsion being present in a relatively small amount by weight with respect to the weight of the shortening, the presence of the emulsion of lecithin and water producing a materially increased volume within a given time.

7. A shortening composition as such, capable of reducing the normal time required for creaming the sugar to a selected volume, comprising a fat and a previously formed emulsion of lecithin in an aqueous solution, the lecithin being present in a relatively small amount by weight with respect to the weight of the fat.

STROUD JORDAN.